(12) United States Patent
Tsai et al.

(10) Patent No.: US 9,604,699 B2
(45) Date of Patent: Mar. 28, 2017

(54) METHOD FOR MANUFACTURING BICYCLE COGSET

(71) Applicant: TIEN HSIN INDUSTRIES CO., LTD., Taichung (TW)

(72) Inventors: Wen-Feng Tsai, Taichung (TW); Wen-Nan Liao, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 252 days.

(21) Appl. No.: 14/527,916

(22) Filed: Oct. 30, 2014

(65) Prior Publication Data

US 2016/0121965 A1    May 5, 2016

(51) Int. Cl.

| | |
|---|---|
| *B29C 39/10* | (2006.01) |
| *B62M 9/10* | (2006.01) |
| *B29C 39/00* | (2006.01) |
| *B29C 65/02* | (2006.01) |
| *B29C 39/12* | (2006.01) |
| *B29C 65/70* | (2006.01) |
| *B29C 65/48* | (2006.01) |
| *B29L 15/00* | (2006.01) |

(52) U.S. Cl.
CPC ............. *B62M 9/10* (2013.01); *B29C 39/003* (2013.01); *B29C 39/10* (2013.01); *B29C 39/12* (2013.01); *B29C 65/02* (2013.01); *B29C 65/48* (2013.01); *B29C 65/70* (2013.01); *B29L 2015/003* (2013.01)

(58) Field of Classification Search
None
See application file for complete search history.

(56) References Cited

U.S. PATENT DOCUMENTS

| | | | | |
|---|---|---|---|---|
| 4,589,860 A | * | 5/1986 | Brandenstein | .......... F16H 55/06 474/152 |
| 4,692,294 A | * | 9/1987 | Fisher, III | ............... B60R 22/40 264/259 |
| 5,935,034 A | * | 8/1999 | Campagnolo | ............ B62M 9/10 474/160 |
| 6,428,437 B1 | * | 8/2002 | Schlanger | ................ B62M 9/10 474/160 |

(Continued)

FOREIGN PATENT DOCUMENTS

TW      M451318      4/2013

*Primary Examiner* — Edmund Lee
(74) *Attorney, Agent, or Firm* — WPAT, PC; Justin King

(57) ABSTRACT

A bicycle cogset manufacturing method includes: connecting a first and a second sprocket in different sizes with connecting members as a sprockets assembly in advance, where first and second inner portions of the first and second sprockets respectively have first insertion and second insertion members, and each of the insertion members are respectively provided with a first and a second positioning hole; transferring the sprockets assembly into a mold, and performing pouring to form a sprocket base, where an assembly hole is disposed in the center of the sprocket base, a plurality of connecting arms are arranged on an outer portion of the sprocket base, and the connecting arms clad the first insertion members and the second insertion members to form a cogset. In this way, modularization can be implemented to achieve objectives of preventing troublesome riveting, accelerating manufacture, and reducing product weight.

11 Claims, 8 Drawing Sheets

(56) References Cited

U.S. PATENT DOCUMENTS

2010/0009794 A1\* 1/2010 Chiang .................... B62M 9/10
                                                                                              474/160
2016/0114859 A1\* 4/2016 Tsai ........................ F16H 55/30
                                                                                               474/160

\* cited by examiner

METHOD FOR MANUFACTURING BICYCLE COGSET

BACKGROUND

Field of the Invention

The present invention relates to a bicycle sprocket, and in particular, to a method for manufacturing a bicycle cogset that can be modularized to increase the efficiency of manufacture and production and reduce a manufacturing cost.

Description of Related Art

Generally, a rear cogset of a variable-speed bicycle has multiple rear sprockets with different sizes assembled on it, and these sprockets are assembled together on a sleeve, where the sleeve is sleeved on a rear hub, and the rear hub is connected to a rear wheel of the bicycle. Pedaling pedals of the bicycle drives a front chainwheel to rotate, the front chainwheel is connected to the rear cogset by a chain hanging thereon, and the chain can be moved by a derailleur of the bicycle to move between two different sprockets of the rear cogset according to a different road condition, so as to drive the bicycle to move forward.

FIG. 1 and FIG. 2 show a bicycle cogset according to Taiwan utility model patent No. M451318, including a base 60, a plurality of long fixing members 70 and short fixing members 74, a large sprocket 80 with the largest outer diameter, a first sprocket 90, a second sprocket 91, a third sprocket 92, and a fourth sprocket 93. The base 60 has a cylindrical body 61, an outer portion of the body 61 is provided with six supporting arms 62, each of the supporting arms 62 has a first surface 63 and a second surface 64 that are opposite to each other, the second surface 64 is provided with a first step portion 641 and a second step portion 642 that are in a staircase shape, the thickness of the first step portion 641 is greater than that of the second step portion 642, and each of the first step portion 641 and the second step portion 642 is provided with a through hole 65. The first surface 63 of each of the supporting arms 62 is provided with the large sprocket 80, and a mounting hole 81 is disposed to correspond to the through hole 65 of the first step portion 641. The first sprocket 90, the second sprocket 91, the third sprocket 92, and the fourth sprocket 93 are disposed sequentially in a direction of the second surface 64. A plurality of mounting holes 901, 911, 921, and 931 corresponding to the long fixing members 70 is respectively distributed annularly on the first sprocket 90, the second sprocket 91, the third sprocket 92, and the fourth sprocket 93. Each of the long fixing members 70 has a large-diameter portion 71, a long shaft 72, and a short shaft 73, so that the first sprocket 90 is riveted by the long fixing members 70 through the mounting holes 901, the fixing members 70 pass through the mounting holes 911 of the second sprocket 91, the through holes 65 of the first step portions 641, and the mounting holes 81 of the large sprocket 80, and finally rivets the large sprocket 80 to the first surface 63.

Each of the short fixing members 74 has a large-diameter portion 75, a long shaft 76, and a short shaft 77. The third sprocket 92 and the fourth sprocket 93 are riveted and fixed by the short shafts 77 of the short fixing members 74 by passing through the mounting holes 921 of the third sprocket 92, and by the long shafts 76 of the short fixing members 74 by passing through the mounting holes 931 of the fourth sprocket 93 and the through holes 65 of the supporting arms 62. As a result, the first sprocket 90, the second sprocket 91, the third sprocket 92, the fourth sprocket 93, and the large sprocket 80 are passed through and riveted by the plurality of long fixing members 70 and the plurality of short fixing members 74, and are integrated together with the base 60.

In assembly, manual work is required, so that the short shaft 73 of the long fixing members 70 passes through the mounting hole 901 of the first sprocket 90, and the long shaft 72 of the long fixing members 70 passes through the mounting hole 911 of the second sprocket 91 and the through hole 65 of the first step portion 641 and is riveted to the first surface 63; and the short shaft 77 of the short fixing members 74 passes through rocket 92, and the long shaft 76 of each of the short fixing members 74 passes through the mounting hole 931 of the fourth sprocket 93 and the through hole 65 of the supporting arm 62 and riveted to the fourth sprocket 93 and the supporting arm 62. It can be seen that the assembly process is quite time-consuming and troublesome, and the matching precision of the elements is difficult to control, which do not satisfy economical requirements.

SUMMARY

In view of this, a main objective of the present invention is to solve the problems that a conventional rear bicycle cogset is time-consuming and troublesome in manufacture and assembly, and is not light in weight.

To achieve the foregoing objective, the present invention discloses a method for manufacturing a bicycle cogset, comprising the following steps:

Step (a1): preparing a first sprocket, where the first sprocket has a first outer portion and a first inner portion, the first outer portion is provided with a plurality of first teeth, the first inner portion is provided with a plurality of first insertion members, and each of the first insertion members is provided with a first positioning hole;

Step (b1): preparing a second sprocket, where the second sprocket has a second outer portion and a second inner portion, the second outer portion is provided with a plurality of second teeth, the second inner portion is provided with a plurality of second insertion members, and each of the second insertion members is provided with a second positioning hole;

Step (c1): preparing a plurality of connecting members, where each of the connecting members has a first pin and a second pin that are formed at different ends, the first pin of the connecting member is disposed in the first positioning hole of the first sprocket, and the second pin of the connecting member is disposed in the second positioning hole of the second sprocket, so as to connect the first sprocket and the second sprocket as a sprockets assembly;

Step (d1): preparing a mold, and placing the sprockets assembly of Step (c1) into the mold;

Step (e1): performing pouring material and molding, that is, pouring material into the mold to form a sprocket base, where an assembly hole is formed in the center of the sprocket base, a plurality of connecting arms are formed on a periphery of the sprocket base, and the connecting arms clad the first insertion members and the second insertion members;

Step (f1): opening the mold to take out a finished cogset.

Therefore, modularization can be implemented accurately and rapidly in manufacture, thereby completely preventing the time-consuming and troublesome manual riveting, reducing the cost, and achieving lightweight by controlling the weight of the elements, so that an economic benefit can be brought, and great industrial applicability can be achieved.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
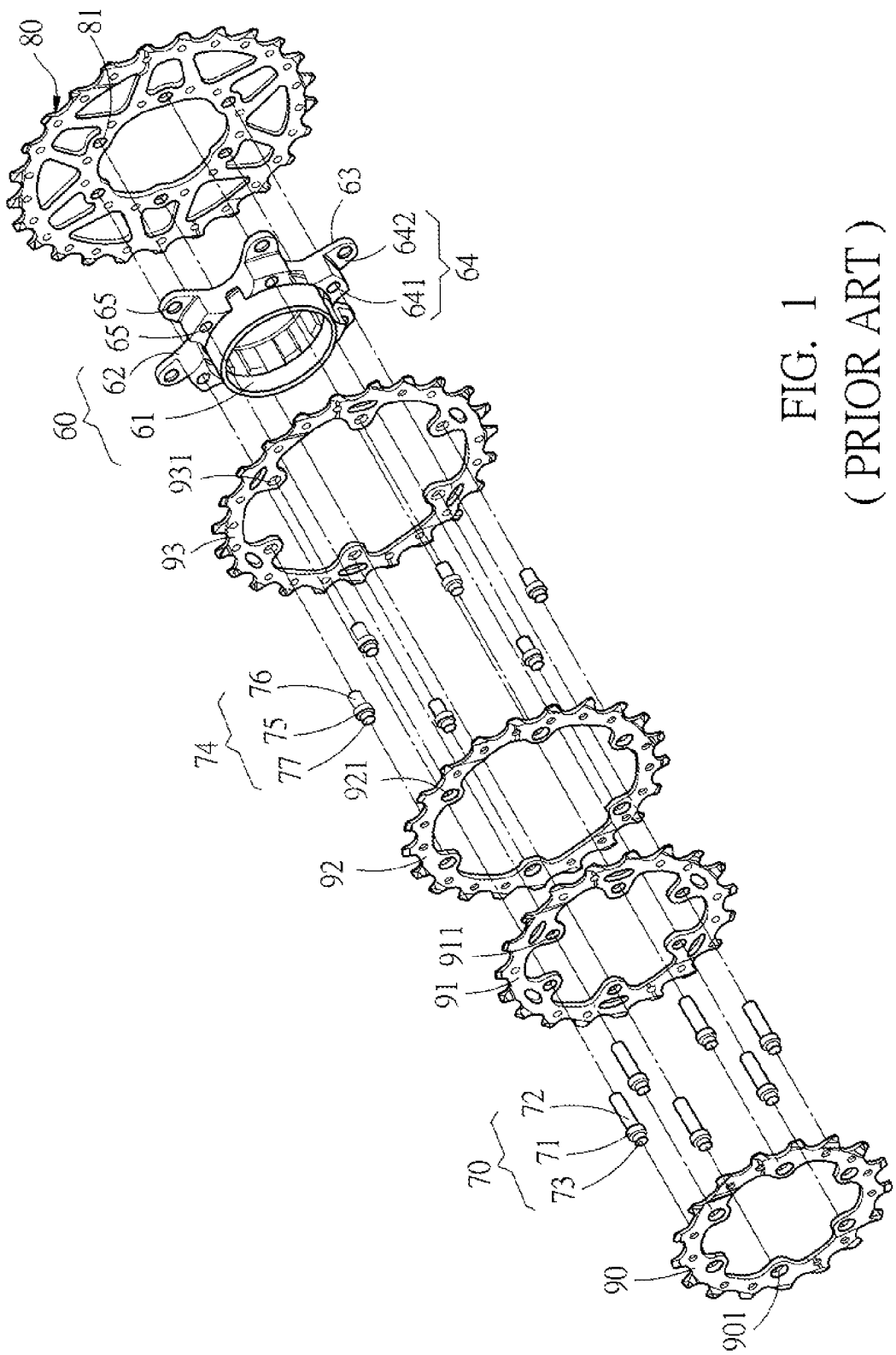
FIG. 1 is an exploded three-dimensional diagram of a conventional bicycle cogset.
Figure 2:
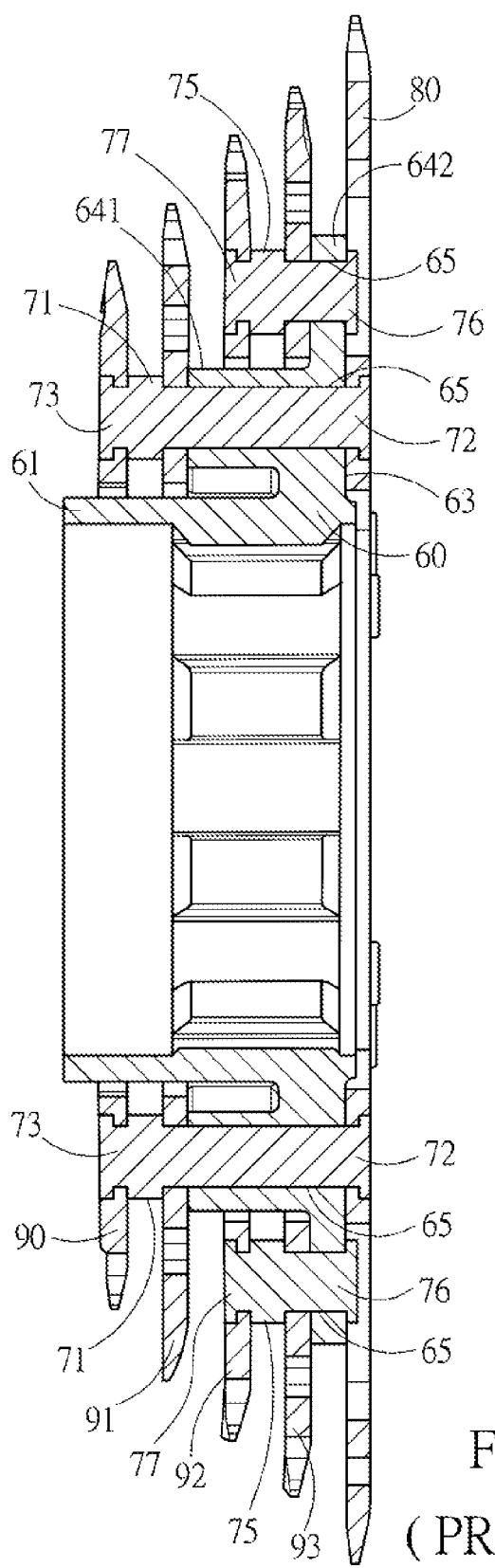
FIG. 2 is a three-dimensional structural diagram of the conventional bicycle cogset.
Figure 3:
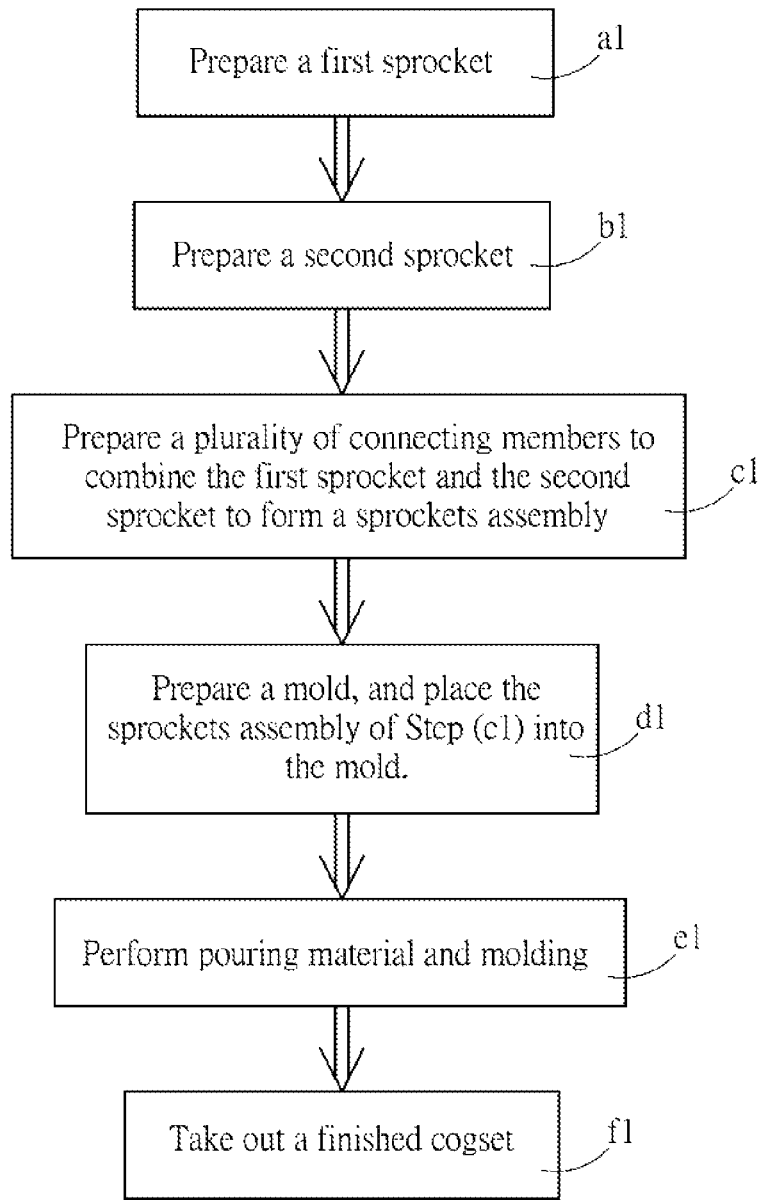
FIG. 3 is a flowchart according to a first embodiment of the present invention.

Detailed content and technical descriptions related to the present invention are further described below by using embodiments, but it should be understood that, the embodiments are merely exemplary, and should not be explained as limitations to the implementation of the present invention.

Referring to FIG. 3 to FIG. 6, the present invention discloses a method for manufacturing a bicycle cogset. A manufacturing process of a first embodiment of the present invention includes the following steps:

Step (a1): Prepare a first sprocket 10, where the first sprocket 10 has a first outer portion 11 and a first inner portion 12, the first outer portion 11 is provided with a plurality of first teeth 13, and the first inner portion 12 is provided with a plurality of first insertion members 14. In this embodiment, the first insertion members 14 are arranged equally spaced on the first inner portion 12, and each of the first insertion members 14 is provided with a first positioning hole 15.

Step (b1): Prepare a second sprocket 20, where the second sprocket 20 is smaller than the first sprocket 10 and has a second outer portion 21 and a second inner portion 22, the second outer portion 21 is provided with a plurality of second teeth 23, and the second inner portion 22 is provided with a plurality of second insertion members 24. In this embodiment, the second insertion members 24 are arranged equally spaced on the second inner portion 22, and each of the second insertion members 24 is provided with a second positioning hole 25.

Step (c1): Prepare a plurality of connecting members 30, where each of the connecting members 30 has a first pin 31 and a second pin 32 that are formed at different ends, and a flange 33 with an outer diameter larger than outer diameters of the first pin 31 and the second pin 32 is disposed in the center of the connecting members 30. The first pin 31 of the connecting members 30 is disposed in the first positioning hole 15, and the second pin 32 of the connecting members 30 is disposed in the second positioning hole 25, so as to connect the first sprocket 10 and the second sprocket 20 as a sprockets assembly. In this case, the flange 33 is formed between the first sprocket 10 and the second sprocket 20 to form a space between the first sprocket 10 and the second sprocket 20.

Step (d1): Prepare a mold, and place the sprockets assembly of Step (c1) into the mold.

Step (e1): Perform pouring material and molding, where one of thermoplastic resin, carbon fiber, or thermosetting resin materials is selected as a pouring material and poured into the mold. In this embodiment, nylon is used as a selected material, a molding temperature is about 240 degrees Celsius to 280 degrees Celsius according to the shape and size of the mold, and a molding time is within 30 seconds to 1 minute. A sprocket base 40 is formed according to the shape of the mold, an assembly hole 41 is disposed in the center of the sprocket base 40, the assembly hole 41 is used for being engaged with a periphery of a sleeve (not shown in the figure) of a rear hub of a bicycle, a plurality of connecting arms 42 are formed on a periphery of the sprocket base 40, and the connecting arms 42 clad the first insertion members 14 and the second insertion members 24.

Step (f1): Open the mold to take out a finished cogset.

In the foregoing manufacturing method of the first embodiment of the present invention, because the sprocket base 40 is formed by pouring a material into a mold, in assembly, in advance, the first pin 31 of each of the connecting members 30 is disposed in the first positioning hole 15 of the first sprocket 10, and the second pin 32 of each of the connecting members 30 is disposed in the second positioning hole 25 of the second sprocket 20, so as to connect the first sprocket 10 and the second sprocket 20 to form a sprockets assembly and then the sprockets assembly are placed into the mold for molding. When the sprocket base 40 is formed, the first insertion members 14 of the first sprocket 10 and the second insertion members 24 of the second sprocket 20 are separately combined and solidified with the connecting arms 42 of the sprocket base 40, and clad the connecting members 30 to be integrated together. Therefore, modularization can be implemented accurately and rapidly in manufacture, thereby completely preventing the time-consuming and troublesome manual riveting and achieving lightweight, so that the cost can be reduced, an economic benefit can be brought, and great industrial applicability can be achieved.

Figure 4:
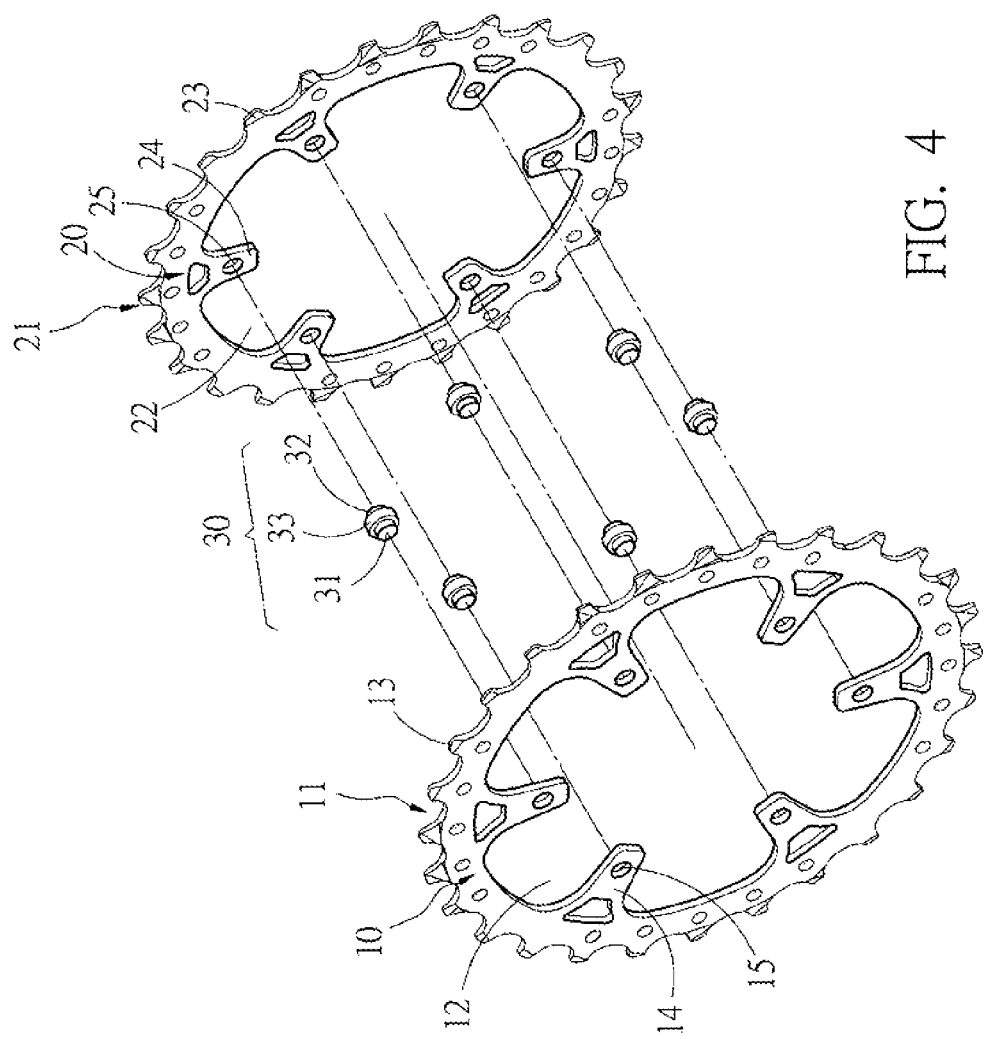
FIG. 4 is an exploded three-dimensional diagram of a first sprocket, a second sprocket, and a pin according to the first embodiment of the present invention.
Figure 5:
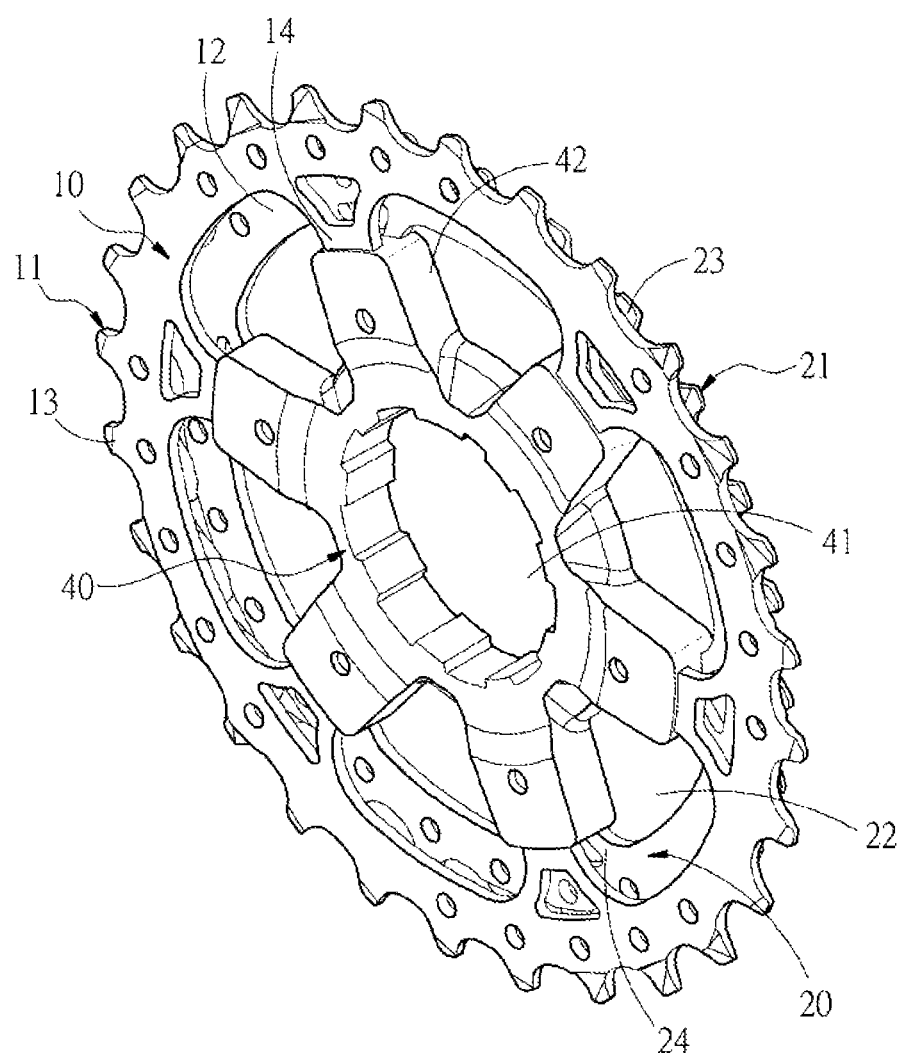
FIG. 5 is a three-dimensional diagram of a finished cogset according to the first embodiment of the present invention.
Figure 6:
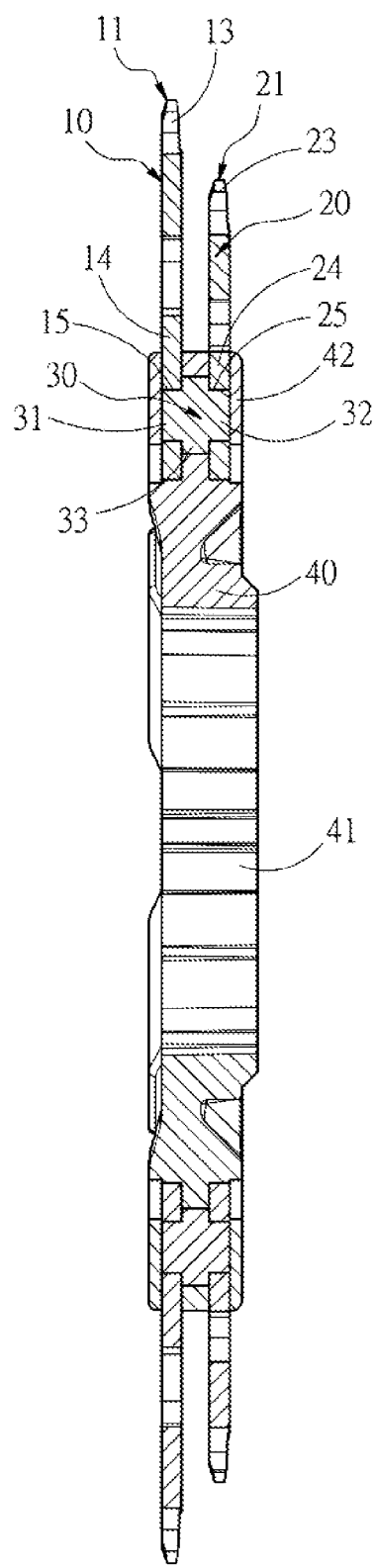
FIG. 6 is a sectional view of the finished cogset according to the first embodiment of the present invention.
Figure 7:
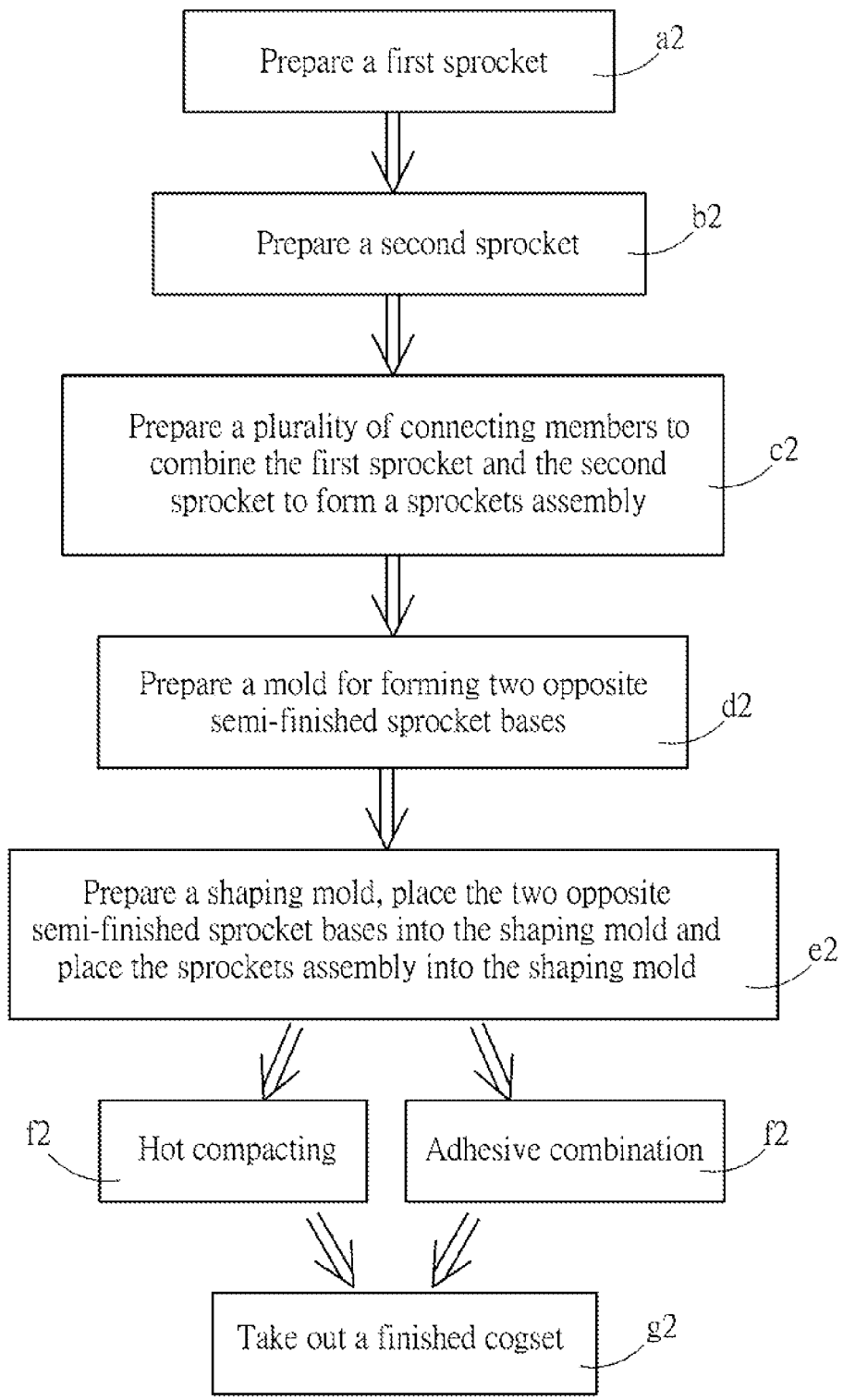
FIG. 7 is a flowchart according to a second embodiment of the present invention.
Figure 8:
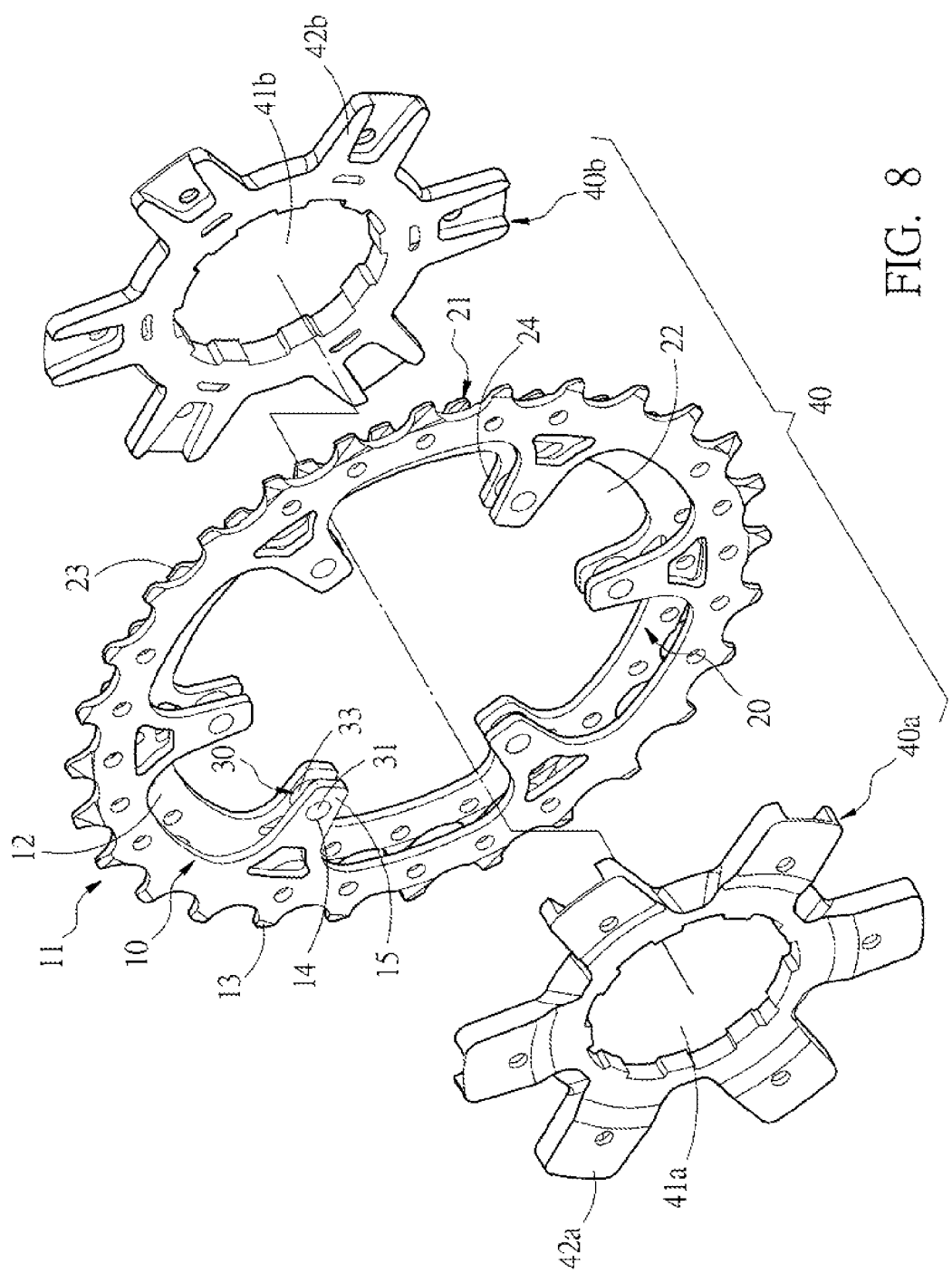
FIG. 8 is a schematic three-dimensional diagram of matching two semi-finished sprocket bases according to the second embodiment of the present invention.

Refer to FIG. 7 in combination with FIG. 4 and FIG. 8, which show a second embodiment of the method for manufacturing a bicycle cogset in the present invention. A manufacturing process includes the following steps:

Step (a2): Prepare a first sprocket 10, where the first sprocket 10 has a first outer portion 11 and a first inner portion 12, the first outer portion 11 is provided with a plurality of first teeth 13, and the first inner portion 12 is provided with a plurality of first insertion members 14. In this embodiment, the first insertion members 14 are arranged equally spaced on the first inner portion 12, and each of the first insertion members 14 is provided with a first positioning hole 15.

Step (b2): Prepare a second sprocket 20, where the second sprocket 20 has a second outer portion 21 and a second inner portion 22, the second outer portion 21 is provided with a plurality of second teeth 23, and the second inner portion 22 is provided with a plurality of second insertion members 24. In this embodiment, the second insertion members 24 are arranged equally spaced on the second inner portion 22, and each of the second insertion members 24 is provided with a second positioning hole 25.

Step (c2): Prepare a plurality of connecting members 30, where each of the connecting members 30 has a first pin 31 and a second pin 32 that are formed at different ends, and a flange 33 with an outer diameter larger than outer diameters of the first pin 31 and the second pin 32 disposed in the center of the connecting members 30. The first pin 31 of the connecting members 30 is disposed in the first positioning hole 15 of the first sprocket 10, and the second pin 32 of the connecting members 30 is disposed in the second positioning hole 25 of the second sprocket 20, so as to connect the first sprocket 10 and the second sprocket 20 to form a sprockets assembly, and the flange 33 is formed between the first sprocket 10 and the second sprocket 20 to form a space between the first sprocket 10 and the second sprocket 20.

Step (d2): Prepare a mold for forming two opposite semi-finished sprocket bases 40a and 40b, select one of thermoplastic resin, carbon fiber, or thermosetting resin materials as a material, and pour the material into the mold for the semi-finished sprocket base. In this embodiment, nylon is used as a selected material, a molding temperature is about 240 degrees Celsius to 280 degrees Celsius, and a molding time is about 30 seconds to 1 minute. A plurality of semi-finished sprocket bases 40a and 40b that correspond to each other are formed, assembly holes 41a and 41b are respectively disposed in the center of the semi-finished sprocket bases 40a and 40b, the assembly holes 41a and 41b are used for being engaged with a periphery of a sleeve of a rear hub of a bicycle, a plurality of semi-finished connecting arms 42a and 42b are respectively formed on peripheries of the semi-finished sprocket bases 40a and 40b, and two semi-finished sprocket bases 40a and 40b are combined face to face to form a complete sprocket base 40.

Step (e2): Prepare a shaping mold, place one of the two semi-finished sprocket bases 40a and 40b, for example, the semi-finished sprocket base 40a, into the shaping mold, place the sprockets assembly into the shaping mold, and place the other semi-finished sprocket base 40b into the shaping mold, so that the two corresponding semi-finished sprocket bases 40a and 40b clad the first sprocket 10 and the second sprocket 20 with one semi-finished sprocket base on the upper side and the other on the lower side, and two opposite semi-finished connecting arms 42a and 42b clad in opposite directions the first insertion member 14, the second insertion member 24, and the pin 30.

Step (f2): Combine and solidify the two semi-finished sprocket bases 40a and 40b into one finished sprocket base 40. Generally, hot compacting may be performed on the shaping mold, or the combination may be implemented directly by an adhesive, so that the two semi-finished sprocket bases 40a and 40b clad the first sprocket 10 and the second sprocket 20 respectively from the upper side and the lower side, and two opposite semi-finished connecting arms 42a and 42b clad the first insertion member 14 of the first sprocket 10, the second insertion member 24 of the second sprocket 20, and the connecting members 30.

Step (g2): Open the shaping mold to take out a finished cogset.

Because the two semi-finished sprocket bases 40a and 40b are formed by pouring a material into a mold which afterwards goes through high temperature and pressure, the first sprocket 10 and the second sprocket 20 are connected in advance by disposing the first pin 31 of the connecting members 30 into the first positioning hole 15 of the first sprocket 10, and disposing the second pin 32 of the connecting members 30 into the second positioning hole 25 of the second sprocket 20, and the two semi-finished sprocket bases 40a and 40b are placed into the shaping mold to clad the first sprocket 10 and the second sprocket 20 to form a finished cogset. Therefore, modularization of the process can be implemented accurately and rapidly, thereby completely preventing the time-consuming and troublesome manual riveting, so that the cost can be reduced, lightweight can be achieved due to no riveting, an economic benefit is brought, and great industrial applicability is achieved.

Although the present invention is disclosed above by using preferred embodiments, a person skilled in the art should understand that the embodiments are merely used to describe the present invention and should not be explained as limitations to the scope of the present invention. It should be noted that, variations and replacements equivalent to the embodiments shall fall within the scope of the present invention. Therefore, the protection scope of the present invention should be subject to the scope of the claims below.

What is claimed is:

1. A method for manufacturing a bicycle cogset, comprising the following steps:
    Step (a1): preparing a first sprocket, wherein the first sprocket has a first outer portion and a first inner portion, the first outer portion is provided with a plurality of first teeth, the first inner portion is provided with a plurality of first insertion members, and each of the first insertion members is provided with a first positioning hole;
    Step (b1): preparing a second sprocket, wherein the second sprocket has a second outer portion and a second inner portion, the second outer portion is provided with a plurality of second teeth, the second inner portion is provided with a plurality of second insertion members, and each of the second insertion members is provided with a second positioning hole;
    Step (c1): preparing a plurality of connecting members, wherein each of the connecting members has a first pin and a second pin that are formed at different ends, the first pin is disposed in the first positioning hole of the first sprocket, and the second pin is disposed in the second positioning hole of the second sprocket, so as to connect the first sprocket and the second sprocket as a sprockets assembly;
    Step (d1): preparing a mold, and placing the sprockets assembly of Step (c1) into the mold;
    Step (e1): performing pouring material and molding, that is, pouring a material into the mold to form a sprocket base, wherein an assembly hole is formed in the center of the sprocket base, a plurality of connecting arms are formed on an outer portion of the sprocket base, and the connecting arms clad the first insertion members and the second insertion members; and
    Step (f1): opening the mold to take out a finished cogset.

2. The method for manufacturing a bicycle cogset according to claim 1, wherein each of the connecting members further has a flange formed between the first pin and the second pin with an outer diameter larger than outer diameters of the first pin and the second pin.

3. The method for manufacturing a bicycle cogset according to claim 1, wherein the first insertion members are arranged equally spaced on the first inner portion, and second insertion members are arranged equally spaced on the second inner portion.

4. The method for manufacturing a bicycle cogset according to claim 1, wherein in Step (e1), a molding temperature is within 240 degrees Celsius to 280 degrees Celsius, and a molding time is within 30 seconds to 1 minute.

5. The method for manufacturing a bicycle cogset according to claim 1, wherein the material of making the sprocket base is one of thermoplastic resin, carbon fiber, or thermosetting resin.

6. A method for manufacturing a bicycle cogset, comprising:
- Step (a2): preparing a first sprocket, wherein the first sprocket has a first outer portion and a first inner portion, the first outer portion is provided with a plurality of first teeth, the first inner portion is provided with a plurality of first insertion members, and each of the first insertion members is provided with a first positioning hole;
- Step (b2): preparing a second sprocket, wherein the second sprocket has a second outer portion and a second inner portion, the second outer portion is provided with a plurality of second teeth, and the second inner portion is provided with a plurality of second insertion members, and each of the second insertion members is provided with a second positioning hole;
- Step (c2): preparing a plurality of connecting members, wherein each of the connecting members has a first pin and a second pin that are formed at different ends, the first pin is disposed in the first positioning hole, and the second pin is disposed in the second positioning hole, so as to connect the first sprocket and the second sprocket as a sprockets assembly;
- Step (d2): preparing a mold for forming two opposite semi-finished sprocket bases, pouring a material into the mold to form two semi-finished sprocket bases opposite to each other, an assembly hole is disposed in the center of the two opposite semi-finished sprocket bases, a plurality of semi-finished connecting arms that can be combined correspondingly are formed on a periphery of each semi-finished sprocket bases, and the two opposite semi-finished sprocket bases can be combined to form a complete sprocket base;
- Step (e2): preparing a shaping mold, placing one of the two semi-finished sprocket bases into the shaping mold, placing the sprockets assembly into the shaping mold, and placing the other corresponding semi-finished sprocket base into the shaping mold, so that the two semi-finished sprocket bases clad the first sprocket and the second sprocket oppositely with the two semi-finished sprocket bases, and the two opposite semi-finished connecting arms clad the first insertion member and the second insertion member correspondingly;
- Step (f2): combining and solidifying the two semi-finished sprocket bases into one finished sprocket base in the mold; and
- Step (g2): opening the shaping mold to take out a finished cogset.

7. The method for manufacturing a bicycle cogset according to claim 6, wherein each of the connecting members further has a flange formed between the first pin and the second pin with an outer diameter larger than outer diameters of the first pin and the second pin, and the flange is formed between the first sprocket and the second sprocket.

8. The method for manufacturing a bicycle cogset according to claim 6, wherein the material for making the semi-finished sprocket bases is one of thermoplastic, carbon fiber, or thermosetting resin.

9. The method for manufacturing a bicycle cogset according to claim 6, wherein Step (f2) is combining and solidifying the two semi-finished sprocket bases into one finished sprocket base by hot compacting.

10. The method for manufacturing a bicycle cogset according to claim 6, wherein Step (f2) is combining and solidifying the two semi-finished sprocket bases into one finished sprocket base by an adhesive.

11. The method for manufacturing a bicycle cogset according to claim 6, wherein in Step (d2), a condition of hot compacting is that a molding temperature is within 240 degrees Celsius to 280 degrees Celsius, and a molding time is within 30 seconds to 1 minute.

* * * * *